United States Patent Office 2,744,879
Patented May 8, 1956

2,744,879
COMPOUNDING BUTYL RUBBER

Elbert C. Ladd, Passaic, N. J., assignor to United States Rubber Company, New York, N. Y., a corporation of New Jersey No Drawing. Application January 11, 1952,
Serial No. 266,099

3 Claims. (Cl. 260—41.5)

This invention relates to a means of effecting substantial improvements in the properties of butyl rubber vulcanizates which are filled with precipitated hydrated silica, precipitated hydrated calcium silicate or kaolin.

This invention is based upon my discovery that the physical characteristics of butyl rubber stocks filled with precipitated hydrated silica, precipitated hydrated calcium silicate or kaolin are materially improved by reacting the filler with 10-undecenyltrichlorosilane, which has the formula $CH_2=CH(CH_2)_9SiCl_3$. This particular unsaturated trichlorosilane is unique in its improvement of the reinforcing properties of such fillers. It is particularly outstanding in the magnitude of its effect in increasing the modulus and in decreasing the hysteresis of the resulting vulcanizates. In its improvement of hysteresis it is superior to the cycloalkyl-halosilanes such as cyclohexenyltrichlorosilane and to the cycloalkenylalkylhalosilanes such as beta-(3-cyclohexenyl)ethyltrichlorosilane, use of which is disclosed and claimed in copending application Serial No. 256,144, filed November 13, 1951, now U. S. Patent 2,665,264 issued January 5, 1954.

This reduction in hysteresis brought about by treatment of the filler with 10-undecenyltrichlorosilane in butyl rubber vulcanizates is unusually pronounced and makes it possible for the rubber compounder to provide butyl rubber vulcanizates filled with the named fillers and having a remarkably low hysteresis.

As the filler I can use a precipitated hydrated silica, a precipitated hydrated calcium silicate or a kaolin. The filler used should have a particle size not greater than 10 microns. Many such fillers are commercially available to the rubber compounder.

The fillers operative in my invention adsorb water under normal atmospheric conditions and are generally obtained with an adsorbed film of water. In general, fillers with water of hydration amounting to not less than 0.02 gram per 100 square meters of surface area are preferred in my invention.

Those fillers which have been prepared or dried at high temperatures (500° F. or higher) are not appreciably changed in their reinforcing properties by the treatment of my invention. An example of such a filler is one made in accordance with U. S. Patent 2,535,036.

I believe the important feature of the fillers used in my invention is that they contain hydroxyl groups which are chemically bound to the matrix of the filler. In hydrated silica and calcium silicate the OH groups are bonded to the silicon atoms and in kaolin the OH groups are bonded to aluminum atoms. For a pertinent discussion see Pauling, "The Nature of the Chemical Bond," Cornell University Press, 1940. I have obtained good results with a finely divided hydrated silica (ca. 200 Angstrom units in diameter) known as "Hi-Sil" which has a surface area of 150 square meters per gram and a degree of hydration equal to 0.073 gram of moisture per 100 square meters of surface area. I have also successfully used a fine particle hydrated silica (ca. 250 Angstrom units in diameter) prepared by removal of water from an aqueous dispersion of hydrated silica known as "Ludox" and having a surface area of 125 square meters per gram and a degree of hydration equal to 0.046 gram of moisture per 100 square meters of surface area. I have obtained good results with a filler known as "Silene EF" which is a precipitated hydrated calcium silicate of a particle size of about 300 Angstrom units diameter and which contains 13–19 percent of water by weight. I have also successfully used clays of the type commonly used as reinforcing fillers in rubber, an example being the rubber filler known commercially as "Suprex" clay which is a kaolin having plate-like particles of a wide distribution of sizes averaging approximately 5000 Angstrom units and having a degree of hydration of 14.1% of water (by weight). All of these fillers respond well to the treatment of my invention and have an average particle size not greater than 10 microns and a degree of hydration not less than 0.02 gram of moisture per 100 square meters of surface area.

The amount of the 10-undecenyltrichlorosilane used for treating the filler in accordance with my invention can vary widely, depending upon numerous factors. Generally speaking, I employ an amount thereof equal to from 5 to 15 percent of the weight of the filler.

One method of carrying out the process of my invention comprises treating the filler with the 10-undecenyltrichlorosilane prior to its incorporation with the butyl rubber. In effecting such pre-treatment of the filler, I have used both a solution method and a vapor phase method. In the solution method, I slurry the filler to be treated in a low-boiling hydrocarbon vehicle, add the undecenyltrichlorosilane to the resulting slurry, heat the mixture to reflux and continue to heat at reflux until substantially all of the silane has reacted with the filler.

The amount of liquid vehicle required to form a smooth flowing slurry varies from filler to filler. The fillers of larger particle size do not occupy such a large bulk as those of finer particle size and consequently require less liquid. Approximately 4 to 7 times as much liquid vehicle (by weight) as filler is usually used with the fillers described herein. Any inert readily volatile solvent for the solane can be used. I can use aromatic hydrocarbon solvents, e. g., benzene, but the cost thereof is prohibitive when operating upon a commercial scale. I prefer to employ the paraffin hydrocarbons such as petroleum ether, because such hydrocarbons are inert with respect to the silane and to the hydrogen chloride given off during the treatment, and at the same time are good solvents for the silane and are readily available at low cost.

A reflux time of three hours is sufficient for most filler-undecenyltrichlorosilane reactions to go substantially to completion. Any unreacted chorine groups can be hydrolyzed with water or can be allowed to remain since they do not affect vulcanization to any appreciable extent.

After the reaction of the filler with the silane is substantially complete, the filler is separated from the liquid, as by filtration or centrifuging, after which the residual solvent is evaporated, usually by moderate heating. If desired, the separated filler can be washed, for example with more of the same solvent that was used as the vehicle during the reaction, prior to the heating to remove residual solvent.

In the vapor phase method of pre-treating the filler, I simply place the filler in a tube and pass air saturated with the undecenyltrichlorosilane through the tube, making suitable provision to trap out unreacted silane and hydrogen chloride from the effluent gas.

The undecenyltrichlorosilane-treated fillers of my invention are new compositions of matter. They are stable over indefinitely prolonged periods of time and can be transported as articles of commerce. Their utility is evidenced by their usefulness in butyl compounding.

Instead of pre-treating the filler with the undecenyltrichlorosilane, I can effect filler treatment "in situ," i. e., by incorporating the undecenyltrichlorosilane directly with the butyl rubber and the filler on the conventional rubber mill or in the conventional internal rubber mixer. The improvement in physical properties of the resulting vulcanizate is of the same character as when the filler is pre-treated with the undecenyltrichlorosilane in the manner described above.

When the "in situ" method of treatment is employed, I much prefer to subject the mixture of butyl rubber, filler and undecenyltrichlorosilane to a hot milling step at an elevated temperature of the order of from 250° to 400° F. This hot milling step is carried out prior to the addition of the zinc oxide and vulcanizing agents to the rubber. The zinc oxide and vulcanizing ingredients are thereafter incorporated in the resulting mixture at a relatively low temperature (substantially below 250° F.) and the mixture is then vulcanized in the conventional manner. I prefer to delay the introduction of zinc oxide and vulcanizing agents until after reaction between the filler and the undecenyltrichlorosilane has been completed because if the zinc oxide and vulcanizing agents were present during the hot milling step they would react with the silane, thereby reducing the extent of improvement of the physical properties of the vulcanizate.

Because hydrogen chloride is a product of the reaction of the undecenyltrichlorosilane with the fillers, when the "in situ" reaction of the silane as just described is practiced, it is important to provide good ventilation during the mixing operations. I have also found it desirable to add an alkaline earth metal carbonate, e. g., calcium carbonate or barium carbonate, to the mixture of butyl rubber, filler and undecenyltrichlorosilane, in an amount sufficient to neutralize all of the hydrogen chloride formed by reaction of the filler and the silane. The use of a weight of finely divided calcium carbonate equal to the weight of the undecenyltrichlorosilane used to treat the filler, is generally sufficient.

An example of a potential use of the vulcanizates of my invention is in the manufacture of butyl inner tubes for pneumatic tires. Heretofore, carbon black has been the only filler having suitable reinforcing properties for use in first quality butyl automotive inner tubes. My invention makes feasible the manufacture of butyl inner tubes of first quality from stocks in which the carbon black has been completely replaced by white fillers such as the aforementioned "Hi-Sil," "Silene EF" or rubber-filling clays like "Suprex" clay. It is highly advantageous to be able to replace carbon black with a cheap white filler like the clays which have heretofore been considered to be far inferior to carbon black as rubber fillers.

The following examples more fully illustrate my invention. Unless otherwise noted the data on physical properties reported in these examples were obtained at room temperatue. The stress at 300% elongation (S–300) is a measure of modulus. Set was determined at break after 30 seconds rather than after the period of 10 minutes recommended by ASTM. Hysteresis results were determined at 280° F. on a torsional hysterometer (see M. Mooney and R. H. Gerke, India Rubber World, 103, 29 (1941)). Durometer hardness was measured as Shore A Durometer after 5 seconds. All parts are by weight.

*Example I*

The filler "Hi-Sil" was slurried in the low boiling hydrocarbon solvent known as "Skellysolve B" whereupon 10-undecenyltrichlorosilane in amount equal to 10% by weight of the filler was added to the slurry. The mixture was heated at reflux for three hours after which the filler was separated by filtration and dried at moderate temperature to remove residual solvent.

The thus-treated "Hi-Sil" was then incorporated in a butyl rubber stock using the following formulation:

| | |
|---|---:|
| Butyl rubber | 100 |
| Zinc oxide | 5 |
| Stearic acid | 1 |
| Sulfur | 1.5 |
| Accelerators | 2.5 |
| "Hi-Sil" silica | 54 |

The stock was press-cured 60 minutes at 307° F. The resulting vulcanizate had the following physical properties.

| | |
|---|---:|
| Durometer hardness | 60 |
| Room temperature tensile, p. s. i. | 2070 |
| Room temperature elongation | 580 |
| Set at break _____per cent__ | 25 |
| S–300, p. s. i. | 825 |
| Torsional hysteresis at 280° F. | 0.08 |

The treatment with undecenyltricholorsilane gave a markedly good modulus and an extremely low torsional hysteresis to the vulcanizate. My experience with stocks of this same type wherein the filler is not treated indicates that they have a durometer hardness of about 67, a room temperature tensile of about 1800 p. s. i., a room temperature elongation of about 750, a set at break of about 50%, an S–300 value of 360 p. s. i. and a torsional hysteresis of about 0.35.

*Example II*

A mixture of 100 grams of "Hi-Sil" silica, 700 grams of benzene and 10 grams of 10-undecenyltrichlorosilane was heated at reflux for 6 hours. The suspension was then cooled, the "Hi-Sil" filtered off, washed with benzene and air-dried.

The treated "Hi-Sil" was then used in a butyl rubber formulation identical with that used in Example I. The resulting mixture was press-cured 40 minutes at 307° F. A control using untreated "Hi-Sil" was similarly processed. The values for modulus and torsional hysteresis of the resulting vulcanizates were as follows:

| | Modulus (S–300) | 280° F. Torsional Hysteresis |
|---|---:|---:|
| Untreated filler | 325 | 0.34 |
| Treated filler | 675 | 0.0875 |

From the foregoing description it will be seen that the present invention offers numerous advantages. The invention can be practiced in a simple and economical manner. Treatment of the fillers in accordance with the invention brings about a remarkable improvement in the properties of the vulcanizates.

A major advantage of the invention is that it effects great improvement in the reinforcing properties of those fillers which have not been considered particularly good rubber reinforcing fillers. The invention enables such an improvement in the reinforcing action of poorly reinforcing fillers like kaolin as to cause them to closely approach or even exceed the reinforcing action of carbon black of the same particle size. It is especially noteworthy that the invention enables the attainment of a greatly increased modulus and at the same time a greatly decreased hysteresis. Many other advantages of the invention will be apparent to those skilled in the art.

I use the term "butyl rubber" herein in its commonly accepted sense, namely to designate a rubbery copolymer of a major proportion, typically 80 to 99.5%, of isobutylene and a minor proportion, typically 20 to 0.5%, of butadiene-1,3 or isoprene, the copolymer having an unsaturation below an iodine number of 50 and a molecular weight above 20,000 and being curable with sulfur to yield an elastic product.

Having thus described my invention, what I claim and desire to protect by Letters Patent is:

1. A vulcanizate of a mixture of a rubery isobutylene-diolefin copolymer and a filler selected from the group consisting of precipitated hydrated silica, precipitated hydrated calcium silicate and kaolin, said filler having been reacted with 10-undecenyltrichlorosilane with liberation of hydrogen chloride.

2. A vulcanizate of a mixture of a rubbery isobutylene-diolefin copolymer and a filler selected from the group consisting of precipitated hydrated silica, precipitated hydrated calcium silicate and kaolin, said filler having an average particle size not greater than 10 microns and having been reacted with 10-undecenyltrichlorosilane with liberation of hydrogen-chloride.

3. The process which comprises vulcanizing a mixture of a rubbery isobutylene-diolefin copolymer and a filler selected from the group consisting of precipitated hydrated silica, precipitated hydrated calcium silicate and kaolin, said filler being characterized by having 10-undecenylsilane groups on the surface thereof.

References Cited in the file of this patent

UNITED STATES PATENTS

| | | |
|---|---|---|
| 2,564,992 | Pechukas | Aug. 21, 1951 |
| 2,610,167 | Te Grotenhuis | Sept. 9, 1952 |